(12) United States Patent
Laine et al.

(10) Patent No.: US 12,275,471 B2
(45) Date of Patent: Apr. 15, 2025

(54) ADAPTABLE WHEELBASE SELF-POWERED DOLLY VEHICLE UNIT

(71) Applicant: Volvo Truck Corporation, Gothenburg (SE)

(72) Inventors: Leo Laine, Härryda (SE); Jesper Blomstrand, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 139 days.

(21) Appl. No.: 17/923,022

(22) PCT Filed: May 11, 2020

(86) PCT No.: PCT/EP2020/063056
§ 371 (c)(1),
(2) Date: Nov. 3, 2022

(87) PCT Pub. No.: WO2021/228360
PCT Pub. Date: Nov. 18, 2021

(65) Prior Publication Data
US 2023/0348000 A1    Nov. 2, 2023

(51) Int. Cl.
*B62D 59/04*    (2006.01)
*B60D 1/145*    (2006.01)
(Continued)

(52) U.S. Cl.
CPC ............. *B62D 59/04* (2013.01); *B60D 1/145* (2013.01); *B60K 1/02* (2013.01); *B62D 21/14* (2013.01); *B62D 53/0864* (2013.01)

(58) Field of Classification Search
CPC .... B62D 59/04; B62D 21/14; B62D 53/0864; B60D 1/145; B60K 1/02
See application file for complete search history.

(56) References Cited

U.S. PATENT DOCUMENTS

| | | | |
|---|---|---|---|
| 10,518,831 B2 | 12/2019 | Wright | |
| 2008/0269986 A1* | 10/2008 | Regnell | B60G 17/0523 701/37 |
| 2019/0233034 A1 | 8/2019 | Viele et al. | |

FOREIGN PATENT DOCUMENTS

| | | |
|---|---|---|
| CN | 101628594 A | 1/2010 |
| CN | 206954008 U | 2/2018 |

(Continued)

OTHER PUBLICATIONS

Intention to Grant for European Patent Application No. 20726331.0, mailed Dec. 20, 2023, 38 pages.
(Continued)

*Primary Examiner* — Huan Le
(74) *Attorney, Agent, or Firm* — Withrow & Terranova, PLLC

(57) ABSTRACT

A self-powered dolly vehicle unit with an adaptable wheelbase, the dolly vehicle unit comprising a front axle arranged to support a pair of steerable front wheels, a rear axle arranged to support a pair of rear wheels, a fifth wheel connection for towing a trailer vehicle, a draw-bar attachment mechanism arranged to hold a draw-bar, and a frame structure arranged to support the front axle and the rear axle at a variable wheelbase distance from each other, wherein the frame structure is arranged to be locked at a first wheelbase distance position and at a second wheelbase distance position.

16 Claims, 8 Drawing Sheets

(51) Int. Cl.
*B60K 1/02* (2006.01)
*B62D 21/14* (2006.01)
*B62D 53/08* (2006.01)

(56) References Cited

FOREIGN PATENT DOCUMENTS

| | | |
|---|---|---|
| CN | 108232081 A | 6/2018 |
| CN | 208325429 U | 1/2019 |
| DE | 102012109331 A1 | 4/2014 |
| DE | 202016006076 U1 | 12/2016 |
| GB | 2516085 A | 1/2015 |
| JP | H09272468 A | 10/1997 |
| WO | 2017196199 A1 | 11/2017 |
| WO | 2018162030 A1 | 9/2018 |

OTHER PUBLICATIONS

International Search Report and Written Opinion for International Patent Application No. PCT/EP2020/063056, mailed Feb. 19, 2021, 14 pages.
First Office Action for Chinese Patent Application No. 202080100642. 2, mailed Jan. 17, 2025, 15 pages.

* cited by examiner

ADAPTABLE WHEELBASE SELF-POWERED DOLLY VEHICLE UNIT

This application is a 35 USC 371 national phase filing of International Application No. PCT/EP2020/063056, filed May 11, 2020, the disclosure of which is incorporated herein by reference in its entirety.

TECHNICAL FIELD

The present disclosure relates to heavy-duty vehicles, such as trucks and construction equipment, and in particular to self-powered dolly vehicles comprising an energy source configured to power various dolly vehicle functions such as steering, propulsion and braking. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle unit can be added to the vehicle combination, which allows for additional trailer units to be towed by the same tractor. A traditional dolly is an unpowered vehicle unit designed for connection to a tractor unit, truck or prime mover vehicle with strong traction power.

Dolly vehicles comprising on-board energy sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered axle dolly vehicles may furthermore be used for improved steering of the vehicle combination, e.g., when negotiating sharp curves.

U.S. Pat. No. 10,518,831 B2 relates to self-powered steerable dolly vehicles. Methods for controlling the dolly vehicles in order to, e.g., negotiate sharp turns, are disclosed. Methods for controlling propulsion and regenerative braking operations in dependence of an upcoming vehicle route to be travelled by the dolly vehicle are also discussed.

Current self-powered dolly vehicles are limited in terms of energy storage capacity due to the restrictions on available space on the dolly vehicle. There is a need for further development of self-powered dolly vehicles in order to extend the range of applications where self-powered dolly vehicles may be used.

SUMMARY

It is an object of the present disclosure to provide more versatile dolly vehicles which can be adapted to different types of transport missions. This object is at least in part achieved by a self-powered dolly vehicle unit with an adaptable wheelbase. The dolly vehicle unit comprises a front axle arranged to support a pair of steerable front wheels and a rear axle arranged to support a pair of rear wheels. The dolly vehicle also comprises a fifth wheel connection for towing a trailer vehicle, a draw-bar attachment mechanism arranged to hold a draw-bar, and a frame structure arranged to support the front axle and the rear axle at a variable wheelbase distance from each other, wherein the frame structure is arranged to be locked at a first wheelbase distance position and at a second wheelbase distance position.

This way the dolly vehicle can be extended to a longer wheelbase when needed for, e.g., carrying additional energy storage capacity, and retracted to a shorter wheelbase when operation as a traditional dolly vehicle is desired. This way the same vehicle unit can be configured to perform both shorter distance transport missions as well as longer distance transport missions requiring more energy.

According to aspects, the draw-bar attachment mechanism is arranged to couple to and to decouple from a drawbar. This means that a drawbar can be added to the vehicle unit as needed. Some transport missions may not require a drawbar, and the drawbar can then be removed in order to not hamper operation. Should operation as a traditional dolly vehicle unit be desired, i.e., use for towing an additional trailer, then a drawbar can be added to the dolly vehicle. More or less advanced drawbars can also be used depending on the particulars of the transport mission. The coupling and un-coupling of the drawbar can be automated or it can be performed manually by service personnel.

According to aspects, the self-powered dolly vehicle unit comprises a bracket configured to releasably hold a first energy source when the frame structure is locked at the first wheelbase distance position, and to releasably hold a second energy source when the frame structure is locked at the second wheelbase distance position. The second energy source is associated with a larger amount of stored energy compared to the first energy source. This versatile bracket system allows the dolly vehicle to hold different sizes (and types) of energy storage units, such as different sizes of batteries, or a differing number of battery modules connected in parallel or in series. The vehicle unit can also be configured to hold both batteries and fuel cells, or combinations thereof.

According to aspects, the frame comprises a front section and a rear section arranged slidably with respect to each other, and a clamping mechanism arranged to releasably hold the front and rear sections in position relative to each other. This arrangement allows for adjusting the wheelbase in a convenient manner. The clamping mechanism allows for securing the frame structure at the desired wheelbase distance. The clamping mechanism may be arranged to be automatically released and engaged in response to a control signal issued from a control unit on-board the dolly vehicle.

According to aspects, the self-powered dolly vehicle unit comprises a hydraulic actuator arranged to extend and to retract the frame structure in response to a control signal. This hydraulic actuator allows for automatically extending and retracting the frame structure to obtain difference wheelbase lengths. An electric machine combined with a rack and pinion mechanism can also be used to extend and to retract the frame structure.

According to aspects, at least one of the front wheels and the rear wheels are driven wheels and at least the other of the front wheels and the rear wheels comprises a brake. The driven wheels and the braked wheels are arranged to extend and to retract the frame structure in response to a control signal. The driven and braked wheels constitute an alternative or a complement to the hydraulic actuator mentioned above.

According to aspects, the self-powered dolly vehicle unit comprises a control unit arranged to control an operation of the self-powered dolly vehicle unit. This control unit may be arranged to determine an energy storage requirement in dependence of a configured transport mission, and to adjust the frame structure to the first wheelbase distance position or to the second wheelbase distance position in dependence of the energy storage requirement. The control unit may also be arranged to determine an energy storage requirement in dependence of a configured transport mission, and to select between a first and a second energy source having different energy storage capacity in dependence of the energy storage requirement. This way the energy storage capability of the dolly vehicle unit can be adapted to the current transport mission, thereby providing a more versatile dolly vehicle unit which can be used for more diverse tasks compared to known self-powered steerable dolly vehicle units.

There is also disclosed herein a method for operating a self-powered dolly vehicle unit comprising an adaptable wheelbase. The method comprises obtaining information related to a transport mission to be executed, and configuring the adaptable wheelbase in dependence of the transport mission. Thus, a more versatile dolly vehicle unit is provided which can serve a wider range of transport missions compared to known known self-powered steerable dolly vehicle units.

According to aspects, the method also comprises determining an energy storage requirement to execute the transport mission, and selecting between a first and a second energy source having different energy storage capacity in dependence of the energy storage requirement. This way the energy storage capability of the dolly vehicle unit is adapted to the current transport mission, which is an advantage since more transport missions can be handled while at the same time not carrying a surplus of energy storage during transport mission requiring less energy. A type of energy storage can also be selected in dependence of the transport mission, such as an electrical energy storage unit or a fuel cell device.

According to aspects, the method furthermore comprises mounting the selected energy source to a frame structure of the dolly vehicle. This mounting can be either automatic or manual.

There is furthermore disclosed herein a method for operating a self-powered dolly vehicle unit comprising an adaptable wheelbase, wherein the adaptable wheelbase is arranged to be adapted automatically in response to a control signal. The method comprises, repeatedly, releasing brakes on a front axle pair of wheels, generating a control signal to extend the adaptable wheelbase to a first wheelbase, engaging brakes on the front axle pair of wheels, releasing brakes on a rear axle pair of wheels, and generating a control signal to retract the adaptable wheelbase to a second wheelbase.

This way the dolly vehicle is able to move forward using only its adjustable frame structure and wheel brakes. This method of propulsion can be used to move the dolly vehicle and perhaps a towed trailer unit away from a dangerous location if the main propulsion mechanism fails. This type of "worm drive" represents a redundant propulsion mechanism, which is an advantage.

There is also disclosed computer programs, computer readable media, computer program products, control units and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
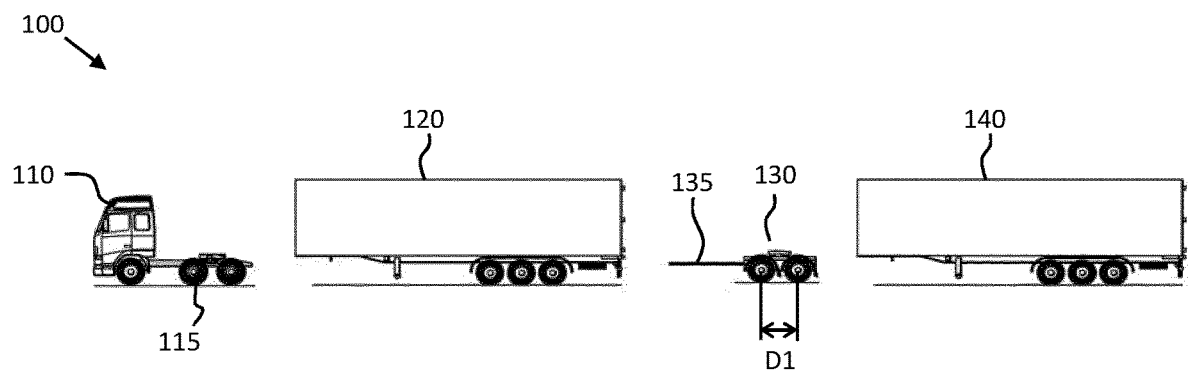
FIGS. 1-3 schematically illustrate some example use cases of the dolly vehicles disclosed herein.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle combination 100 for cargo transport. The vehicle combination 100 comprises a truck or towing vehicle 110 supported on wheels, at least some of which are driven wheels 115. The truck 110 is configured to tow a first trailer unit 120 in a known manner. To extend the cargo transport capability of the vehicle combination, a dolly vehicle 130 can be connected to the rear of the first trailer 120 via a drawbar 135. This dolly vehicle can then tow a second trailer 140.

A dolly vehicle 130 is traditionally a passive vehicle comprising no driven or steerable axles, and with a relatively short wheelbase D1. It has recently been shown that self-powered steerable dolly vehicles may provide both increased fuel efficiency and maneuverability. This type of self-powered dolly vehicle comprises an on-board energy source and at least one pair of driven wheels.

Increased fuel efficiency is for instance obtained if an electric machine arranged for regenerative braking is installed in the dolly vehicle. The vehicle combination then effectively becomes a hybrid electric vehicle, even if the towing vehicle only comprises a traditional diesel engine with no on-board electric hybridization. An example of this type of self-powered dolly vehicle will be discussed in more detail below in connection to, e.g., FIG. 9.

Both the truck 110 and the self-powered steerable dolly vehicle 130 may comprise electric machines for propulsion and/or regenerative brakes for decelerating the vehicle unit while harvesting energy. The self-powered vehicle units also comprise respective energy sources. An energy source is normally a battery, super-capacitor, fuel cell or other device arranged to store electrical energy. However, an energy source may also comprise mechanical energy storage devices such as springs and compressed air tanks for pneumatic machines. Combinations of different types of energy sources can also be used. A traditional fuel tank for storing gasoline or diesel fuel can of course also be considered an energy source in this context.

The present disclosure relates to additional uses for self-powered dolly vehicles, where the dolly vehicle can be re-purposed from the traditional use in towing an extra trailer unit to become a prime mover for shorter or longer distance transport missions.

Figure 2:
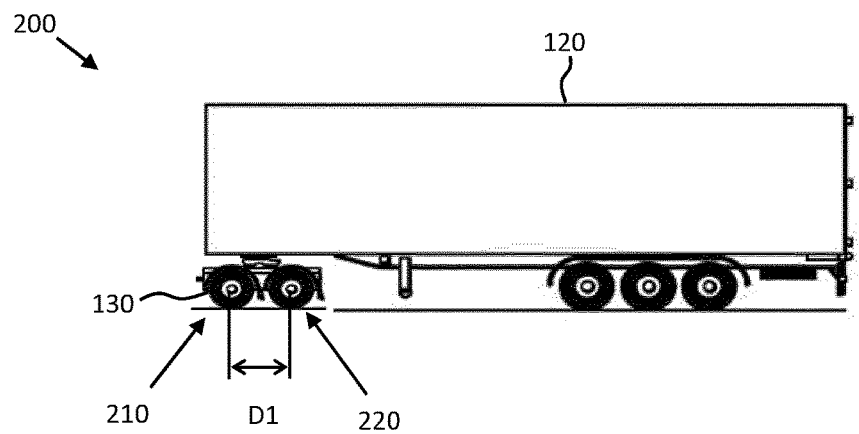

FIG. 2 illustrates a vehicle combination 200 comprising a self-powered dolly vehicle 130. This dolly vehicle is now configured as prime mover and tows the trailer unit 120 without assistance from other vehicle units. The dolly vehicle 130 comprises a front axle 210 and a rear axle 220. The distance between the two axles is often referred to as the wheelbase of the vehicle unit. The wheelbase D1 of the dolly vehicle 130 in FIG. 2 is relatively short, corresponding to a normal wheelbase of a traditional dolly vehicle unit 130 such as that shown in FIG. 1. This wheelbase, although not very large, still allows for mounting an energy source which enables the dolly vehicle to manoeuvre the trailer unit 120 during shorter transport missions. One example of a use case for the self-powered dolly vehicle 130 shown in FIG. 2 is manoeuvring at a cargo terminal, which will be discussed in more detail below in connection to FIG. 6. A longer vehicle combination such as the vehicle combination 100 shown in FIG. 1 may, for instance, release its dolly vehicle outside of a busy cargo terminal. The dolly vehicle 130 may then manoeuvre the trailer up to a loading bay or the like inside the terminal, thereby providing a more efficient unloading and/or loading operation. The dolly vehicle may then automatically couple to some other trailer and tow this trailer back to the truck which is waiting outside of the busy cargo transport terminal. Note that the drawbar 135 shown in FIG. 1 has been detached from the dolly vehicle unit in FIG. 2, since it is not needed for the transport mission at hand. The dolly vehicle 130 in FIG. 2 does not have a sufficient wheelbase in order to carry a larger energy source, and will therefore most likely not be able to execute longer distance transport missions.

A central concept of the techniques disclosed herein is a dolly vehicle with an adaptable wheelbase. This means that the wheelbase of the dolly vehicle can be adjusted according to the requirements of the current transport mission to be executed. A larger wheelbase allows for mounting a larger energy source, such as a larger battery, thereby enabling the dolly vehicle to perform longer more energy demanding transport missions. A smaller wheelbase on the other hand allows for a more traditional use of the dolly vehicle 130. This way the range of applications where the dolly vehicle can be used is extended, which is an advantage. Herein, the relative terms small and large when used in connection to the wheelbase of a vehicle is to be construed as relating to vehicle length. A large wheelbase has a longer distance between wheel axles compared to a smaller wheelbase. A traditional dolly vehicle normally has a smaller wheelbase compared to a towing truck used for towing semi-trailers and the like.

Figure 3:
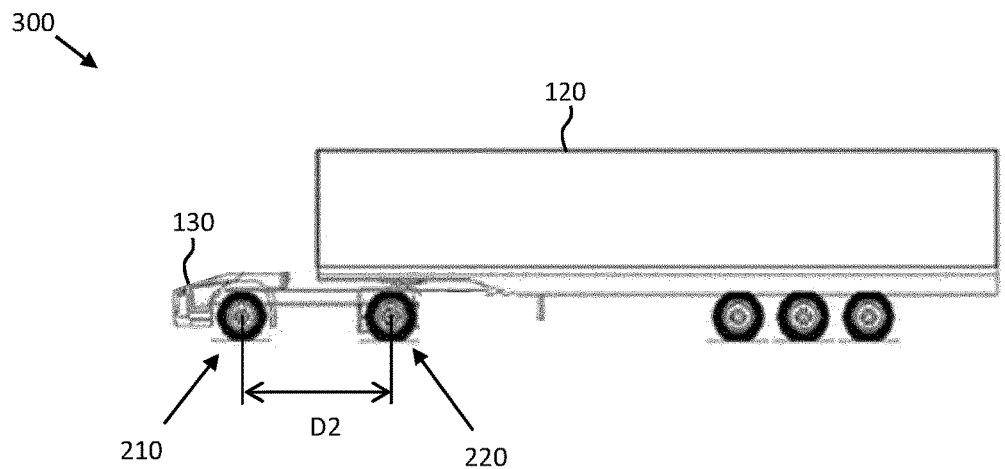

FIG. 3 schematically illustrates a vehicle combination 300 where the wheelbase D2 of the dolly vehicle unit 130 has been extended. This allows the dolly vehicle 130 to carry enough energy storage devices to, e.g., tow a trailer unit 120 for a longer distance, such as between two cargo terminals. The drawbar 130 shown in FIG. 1 has been disconnected also in FIG. 3, since it serves no purpose when the dolly vehicle is acting a prime mover.

Both the towing vehicle 110 and the steerable dolly vehicle 130 comprises control units, which will be discussed in more detail below in connection to FIG. 9. These control units can be arranged according to a layered functional architecture where some functions may be comprised in a traffic situation management (TSM) layer and some other functions may be comprised in a vehicle motion management (VMM) layer.

Generally, the TSM layer plans vehicle operation with a time horizon of, e.g., 10 seconds. This time frame for instance corresponds to the time it takes for the vehicle to negotiate a curve, i.e., to transition from driving straight to entering the curve and then exiting the curve again. The TSM layer continuously requests desired acceleration profiles and curvature profiles from the VMM layer. The VMM layer operates with a time horizon of about 1 second or so, and continuously transforms the acceleration profiles and curvature profiles into control commands, sometimes referred to as requests, for the various motion support device (MSD) functions on the vehicle, i.e., it among other things performs MSD coordination.

Figure 4:
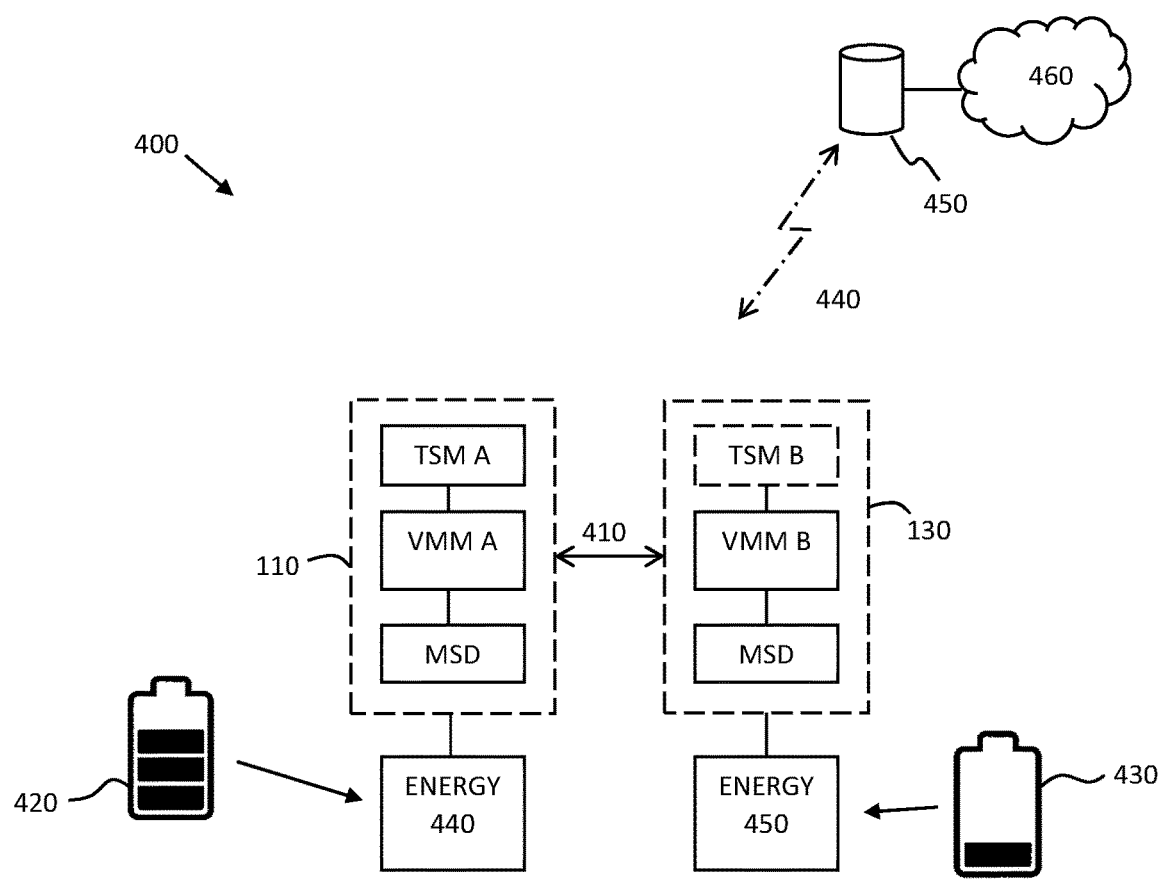
FIG. 4 illustrates a vehicle control system.

FIG. 4 schematically shows an example vehicle control stack 400 in which various vehicle control functions are incorporated. The towing vehicle 110 comprises one stack, and the dolly vehicle 130 comprises another stack. The two stacks are connected via an interface 410 allowing exchange of control messages and status information between the two stacks. A truck 110 comprising a control unit implementing both TSM and VMM functions may then act as master, while the one or more dolly vehicles in a vehicle combination operate in a slave mode where they are controlled from the master mode control unit. Thus, although the control unit in the dolly vehicle 130 may comprise a stand-alone TSM function (TSM B), this function is at least partly inactivated in FIG. 4 since the TSM functions are being executed by the master control unit in the truck 110.

When the self-powered dolly vehicle 130 is connected to a prime mover, such as in the vehicle combination 100 shown in FIG. 1, it may act in a slave mode configuration. While in slave mode the TSM function is inactivated and the dolly vehicle 130 receives control commands via the interface 410 from the control stack in the prime mover 110 which is acting as master. However, when the dolly vehicle is disconnected from the prime mover and operates in standalone mode, as exemplified in FIGS. 2 and 3, then the TSM function (TSM B) is activated in order for the dolly vehicle to be able to operate independently from the truck 110. This type of independent operation may comprise autonomously executing a transport mission. Control functions for autonomous drive is known in general and will therefore not be discussed in more detail herein.

Each control stack is communicatively coupled to one or more on-board energy sources 440, 450. The control units are therefore aware of the energy storage capacity and current energy amount in the energy storage devices. For instance, if the energy source is a battery, then the control unit is aware of the current state of charge and the energy storage capacity of the energy source 420, 430.

The dolly vehicle control unit may according to some aspects control the wheelbase configuration of the dolly vehicle. For instance, if it is determined that the dolly vehicle requires additional energy storage to execute the current transport mission, then the wheelbase may be extended in order to accommodate this additional energy storage. If the transport mission comprises acting as a traditional dolly vehicle to tow an additional second trailer unit, such as illustrated in FIG. 1, then the dolly vehicle wheelbase can be reduced.

The dolly vehicle 130 may comprise a number of on-board sensors in order to facilitate autonomous operation. Such sensors may, e.g., comprise radar sensors, vision-based sensors, lidar and global navigation satellite system receivers (GNSS). The sensor data is arranged to be fed to the control unit in the dolly vehicle. Such sensor systems are known in general and will not be discussed in more detail herein.

Additionally, the vehicle control stack may comprise a wireless connection 440 to a remote server or processing unit 450. The remote server or processing unit 450 may in turn be connected to or form part of a remote network. Information communicated by the vehicle control stack 400 to the remote server or processing unit 450 may comprise information related to a transport mission to be performed by the vehicle combination. The control unit or units 110, 130 can then estimate the required energy storage capacity required in order to execute the transport mission. The dolly vehicle control unit can determine that an extension of the wheelbase is required based on the information.

For example, the control unit in the dolly vehicle 130 may perform the following sequence of operations. The vehicle unit first receives a transport mission description. This description can, e.g., be received via the wireless link 440 from the remote server 450 or from a control tower communicatively connected to the dolly vehicle. The mission information includes knowledge about the dynamic driving tasks to be performed, and the operational design domain (ODD) which is to be expected. The control unit in the dolly vehicle then performs mission planning, and thereby determines requirements on energy storage capacity, e.g., what size of battery that is needed in order to fulfil the transport mission according to the given specifications. If the dolly vehicle control unit is operating in slave mode, it informs the master control unit about the requirements on energy storage that it has determined. If the dolly vehicle control unit is instead operating in master mode, and is to perform the transport mission on its own, then it drives itself to a place where it can remove the drawbar 135. The VMM in the dolly vehicle then modifies the wheelbase of the dolly vehicle to be able to adapt for the mission length and requirement for energy source size. Practically, this means that chassis frame beams are unlocked so the vehicle length can be extended. Some examples of this operation will be discussed below in connection to FIGS. 10A-D. When the desired wheelbase is achieved, the chassis frame structure is locked. An energy source corresponding to the requirements on energy storage capacity is then attached to the dolly vehicle. The dolly vehicle may then drive itself to the location of, e.g., a trailer, pick up the trailer by attaching itself via fifth wheel connection to the trailer, and then initiate the transport mission.

Figure 5:
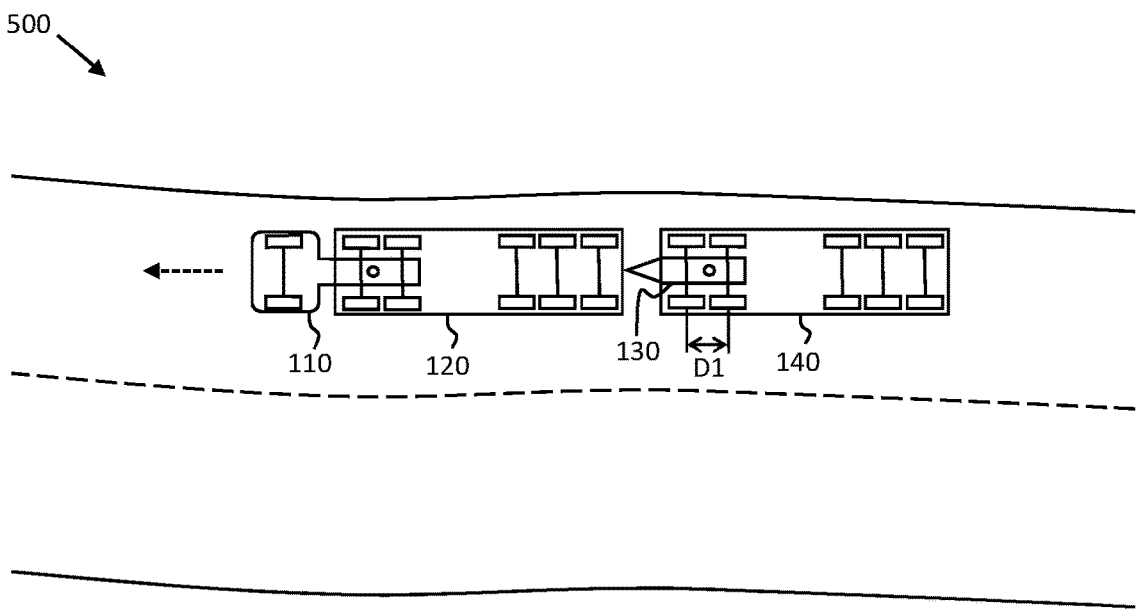
FIG. 5 shows an example vehicle combination during a long haul transport mission.

FIG. 5 shows an example 500 of a long haul transport mission. A truck 110 then acts as master and tows a first trailer unit 120. A self-powered dolly vehicle unit 130 operates in slave mode and tows a second trailer 140. The dolly vehicle 130 is connected to the second trailer via its fifth wheel connection, and to the first trailer via its drawbar connection. In this case the dolly wheelbase is locked at a first distance D1. This means that a frame structure of the dolly vehicle arranged to support the front axle and the rear axle at a variable wheelbase distance from each other is locked at a first wheelbase distance position.

Figure 6:
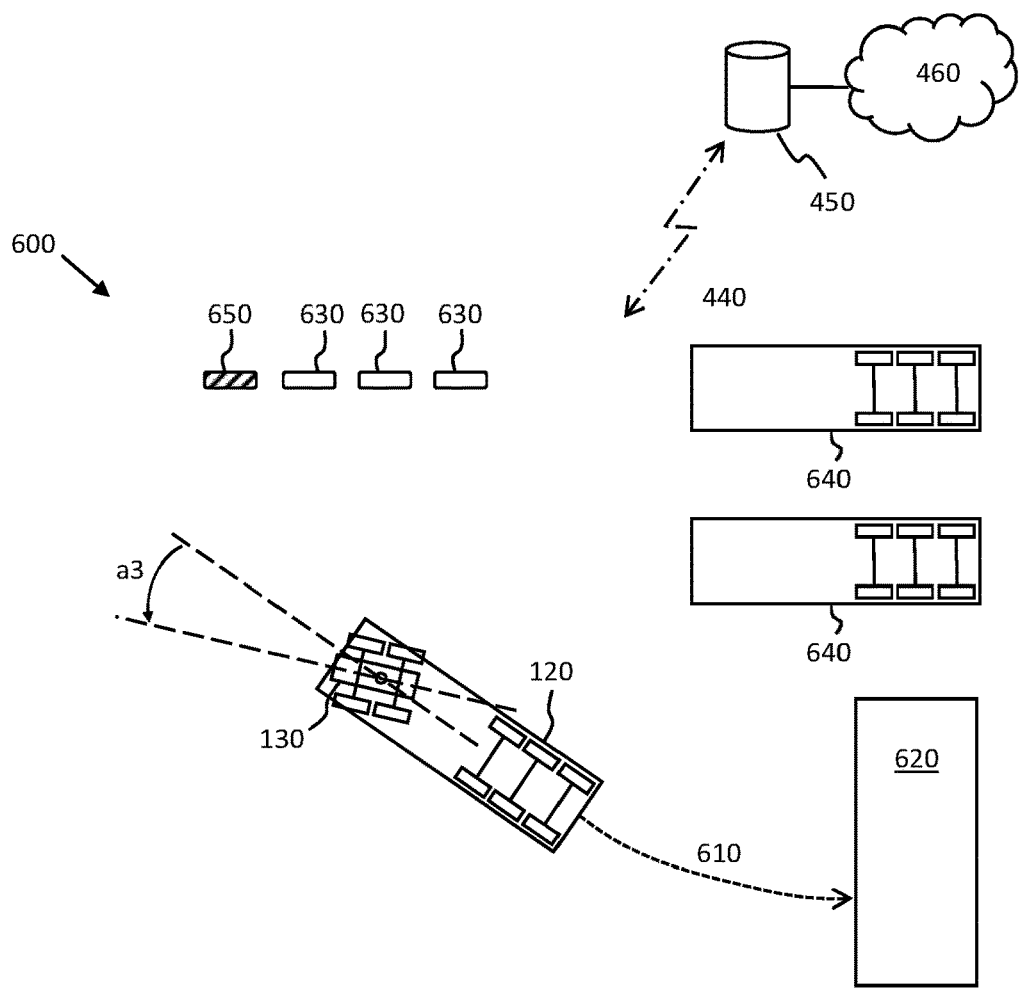
FIG. 6 shows an example dolly vehicle during a terminal transport mission.

FIG. 6 shows another example transport mission 600. Here the dolly vehicle 130 is operating as master and autonomously maneuvers a trailer unit 120 along a track 610 up to a loading bay 620. Once the trailer 120 has been loaded at the loading bay 620, the dolly vehicle may, e.g., receive a new transport mission involving a more long distance transport. The dolly vehicle 130 may then adjust its wheelbase, pick up one or more additional battery units 630, and tow the trailer 120 to its destination according to the specifications of the transport mission. As another example, the dolly vehicle 130 may park the trailer 120 after unloading, and then pick up another trailer 640 in order to perform some other transport mission.

According to some aspects the dolly vehicle 130 is a hybrid electric vehicle also comprising a combustion engine. In this case the dolly vehicle 130 may also pick up one or more fuel tanks 650 allowing it to perform more long haul transport missions.

Figure 7:
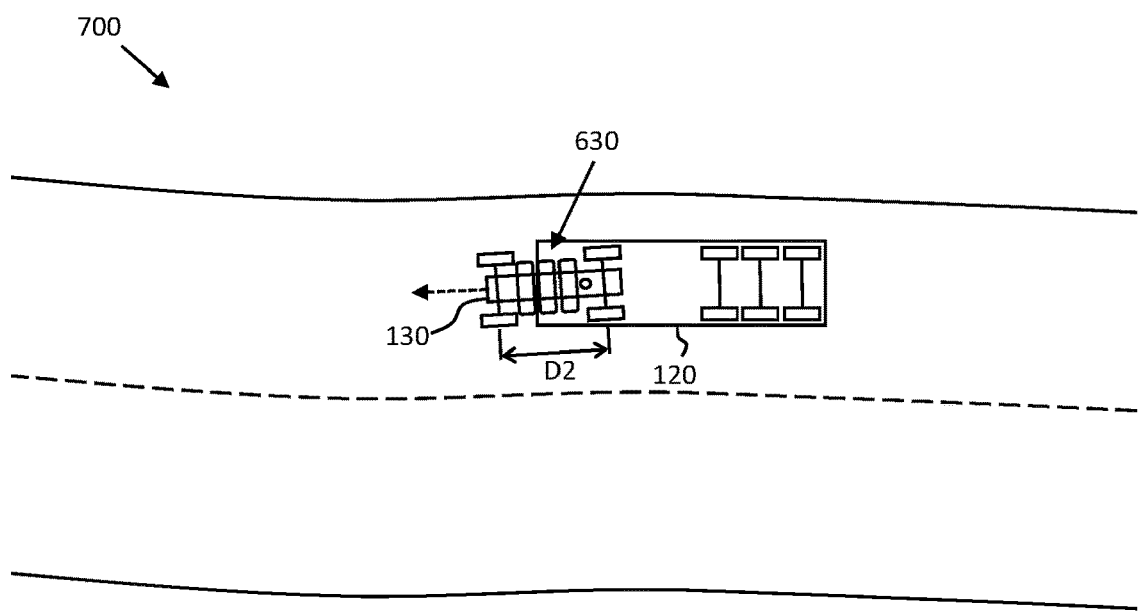
FIG. 7 shows an example dolly vehicle performing a long haul transport mission.

FIG. 7 shows a further example 700 where the dolly vehicle unit 130 is executing a long haul transport mission. The dolly vehicle has then extended its wheelbase D2 in order to be able to carry more energy storage 630. This means that the frame structure of the dolly vehicle arranged to support the front axle and the rear axle at a variable wheelbase distance from each other is locked at a second wheelbase distance position.

Thus, advantageously, the dolly unit is arranged to adapt its wheelbase in order to carry the required amount and type of energy storage units 630 for short or longer transport missions.

To summarize, with reference also to FIGS. 9 and 11A-D, there is disclosed herein a self-powered dolly vehicle unit 130 with an adaptable wheelbase. The wheelbase is the distance between a front axle 210 of the dolly vehicle 130 arranged to support a pair of steerable front wheels 950 and a rear axle 220 arranged to support a pair of rear wheels 960. The dolly vehicle 130 comprises a fifth wheel connection 930 for towing a trailer vehicle 120, 140. The dolly vehicle 130 also has a draw-bar attachment mechanism 940 arranged to hold a draw-bar 135. However, it is appreciated that a drawbar is not necessarily always attached to the draw-bar attachment mechanism 940 (as exemplified in, e.g., FIG. 11D). The draw-bar attachment mechanism 940 may according to some aspects be arranged to couple to and to decouple from a drawbar 135. This coupling and de-coupling ability allows the dolly vehicle to be equipped with a drawbar only when needed, i.e., when it is desired to tow the dolly vehicle. The draw-bar attachment mechanism 940 may be arranged for automatically coupling and de-coupling to a drawbar 135. Thus, the dolly vehicle 130 may drive itself to a location where drawbars are stored, couple to a drawbar 135, and then perform a transport mission involving use of the drawbar. When the transport mission is complete, the dolly may return the drawbar 135 to the drawbar storage location.

The dolly vehicle 130 also comprises a frame structure 970 arranged to support the front axle 210 and the rear axle 220 at a variable wheelbase distance D1, D2 from each other. This adjustable wheelbase is key to the present disclosure, since it allows for adapting the dolly vehicle to different types of transport missions. The frame structure 970 is arranged to be locked at a first wheelbase distance position and at a second wheelbase distance position. Of course, the frame structure can be arranged to be locked at more than two positions, and the two positions need not necessarily correspond to predetermined wheelbases.

Figure 10A:
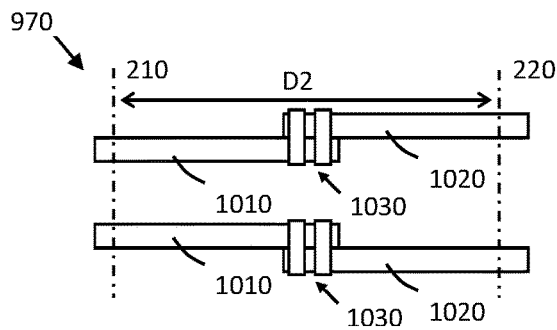
FIGS. 10A-D show example frame structures.
Figure 10C:
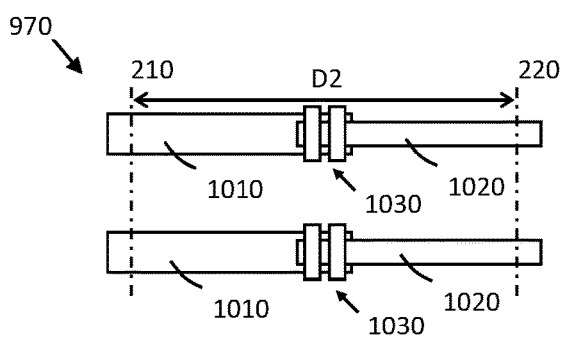
Figure 10B:
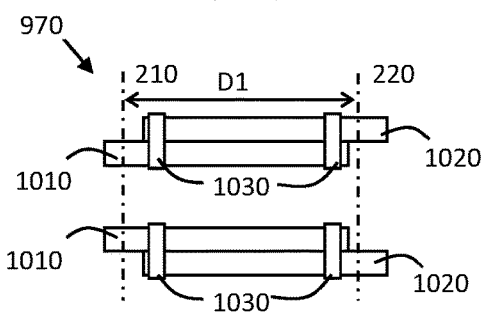

FIGS. 10A and 10B schematically illustrate a first example of the frame structure 970. This example frame structure comprises a front section 1010 and a rear section 1020 arranged slidably with respect to each other, and a clamping mechanism 1030 arranged to releasably hold the front and rear sections in position relative to each other. Thus, to adjust the wheelbase, the clamping mechanism 1030 can be released and the frame structure can then be extended or retracted before it is again locked in position with the clamping mechanism. The clamping mechanism allows for securing the frame structure at the desired wheelbase distance. The clamping mechanism may be arranged to be automatically released and engaged in response to a control signal issued from a control unit on-board the dolly vehicle. FIG. 10A shows an extended wheelbase configuration and FIG. 10B shows a retracted wheelbase configuration.

Figure 10D:
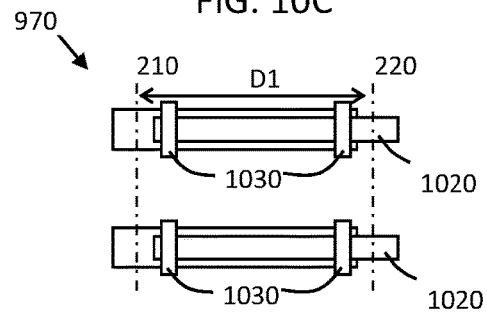

FIGS. 10C and 10D illustrate another example where the front section 1010 and the rear section 1020 are comprised in a telescopic arrangement. The rear section beams then traverse along a track formed in the front section such that the wheelbase can be adjusted freely. There is again a clamping mechanism provided by which the frame structure can be locked at a given wheelbase. FIG. 10C shows an extended wheelbase configuration and FIG. 10B shows a retracted wheelbase configuration.

According to some aspects, the self-powered dolly vehicle unit 130 comprises a hydraulic actuator arranged to extend and to retract the frame structure 970 in response to a control signal. In the example of FIGS. 10A-D, the clamping mechanism is then first released whereupon the hydraulic actuator is used to adjust the relative positions of the front section 1010 and the rear section 1020.

According to some other aspects, at least one of the front wheels 950 and the rear wheels 960 are driven wheels and at least the other of the front wheels 950 and the rear wheels 960 comprises a brake. The driven wheels and the braked wheels are then arranged to extend and to retract the frame structure 970 in response to a control signal. This way the dolly vehicle propulsion function can be used to extend and to retract the adjustable wheelbase of the dolly vehicle.

Other example mechanisms for extending and retracting a frame structure such as the frame structure 970 comprise arranging electric machines and wheel brakes at each wheel of the dolly, providing an electric motor with a rack and pinion mechanism to extend and to retract the frame structure, and simply allowing manual extension and retraction by service personnel.

The front wheel pair 950 and the rear wheel pair 960 may be driven by electric machines, wherein each wheel is arranged to be driven by a respective electric machine. Alternatively, a pair of wheels may be driven by a single electric machine via a differential. The electric machines are normally also arranged for regenerative braking.

Figure 9:
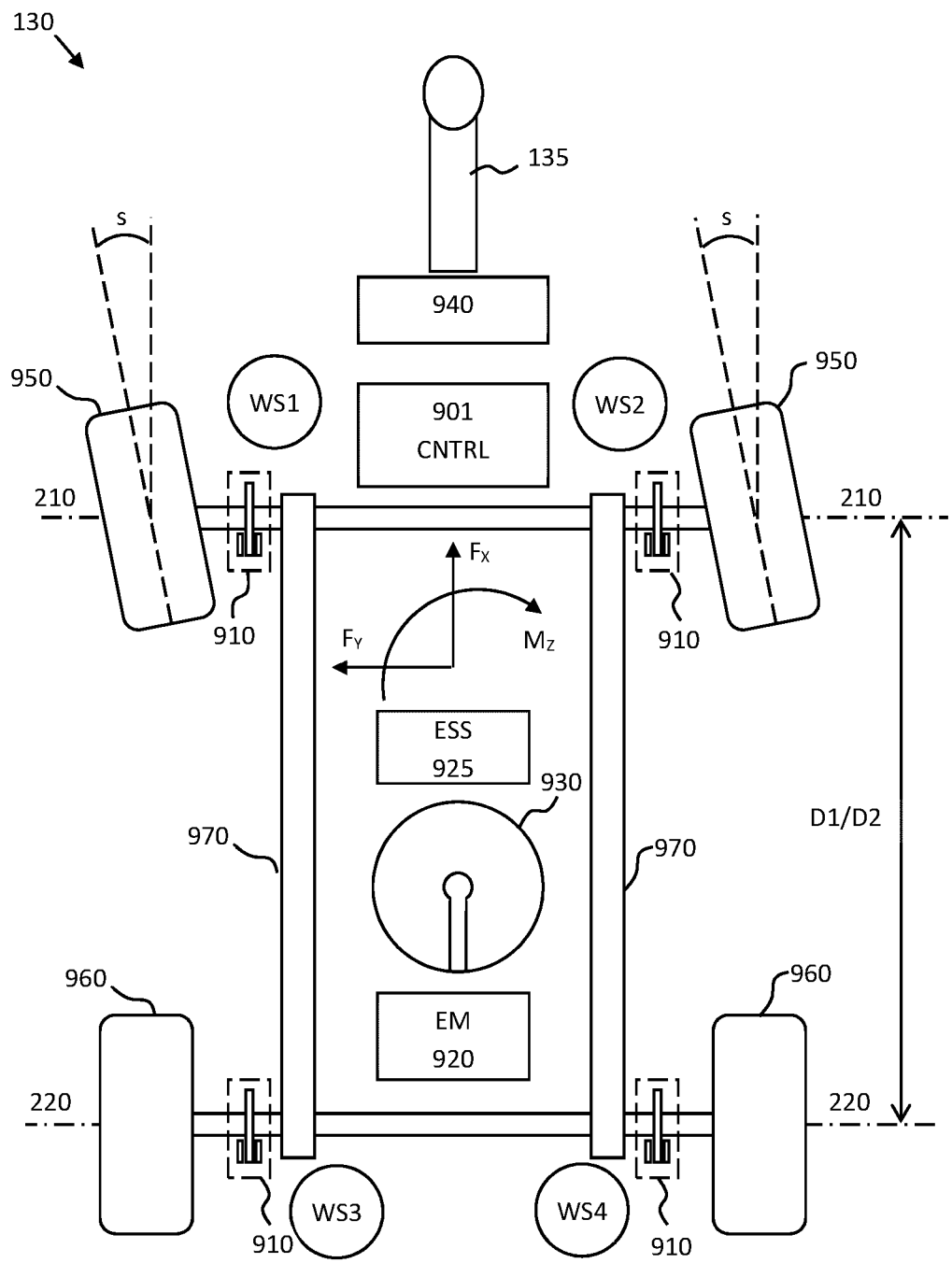
FIG. 9 schematically illustrates details of a self-powered dolly vehicle.

The example self-powered dolly vehicle unit 130 shown in FIG. 9 also comprises a control unit 901 arranged to control an operation of the self-powered dolly vehicle unit 130. This control unit 901 may, as discussed above in connection to FIG. 4, be configured in master mode where the dolly vehicle operates in a standalone autonomous manner, or in a slave mode where the dolly vehicle relies on external control signals received from an external master control unit for its main functionality.

The control unit 901 may according to some aspects be arranged to determine an energy storage requirement in dependence of a configured transport mission, and to adjust the frame structure 970 to the first wheelbase distance position or to the second wheelbase distance position in dependence of the energy storage requirement. The control unit 901 may also be arranged to determine an energy storage requirement in dependence of a configured transport mission, and to select between a first and a second energy source having different energy storage capacity in dependence of the energy storage requirement.

As discussed above in connection to FIG. 6, the self-powered dolly vehicle unit 130 may also comprise a bracket configured to releasably hold a first energy source when the frame structure 970 is locked at the first wheelbase distance position, and to releasably hold a second energy source when the frame structure 970 is locked at the second wheelbase distance position, wherein the second energy source is associated with a larger amount of stored energy compared to the first energy source. This means that the dolly vehicle can be equipped with an amount of energy storage in dependence of the transport mission which is to be carried out. For shorter distance missions a smaller amount of energy may be required, while more long-haul assignments may require additional energy storage. This energy storage may also, as mentioned above, comprise fuel tanks and other types of energy sources. Thus, according to aspects, the first energy source comprises any of an electrical energy storage, a fuel cell, or a fuel tank, and the second energy source comprises any of an electrical energy storage, a fuel cell, or a fuel tank.

The dolly vehicle 130 may in some cases be configured with software and hardware to autonomously pick up the required energy sources, or the energy sources can be manually attached to the dolly vehicle as needed by service personnel.

Figure 11A:
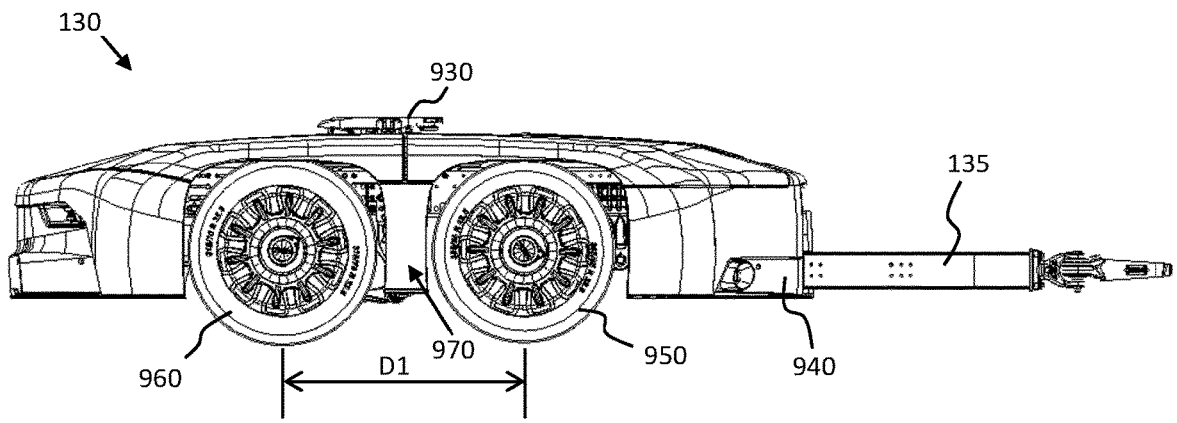
FIGS. 11A-D show example dolly vehicles with adaptable wheelbases.
Figure 11B:
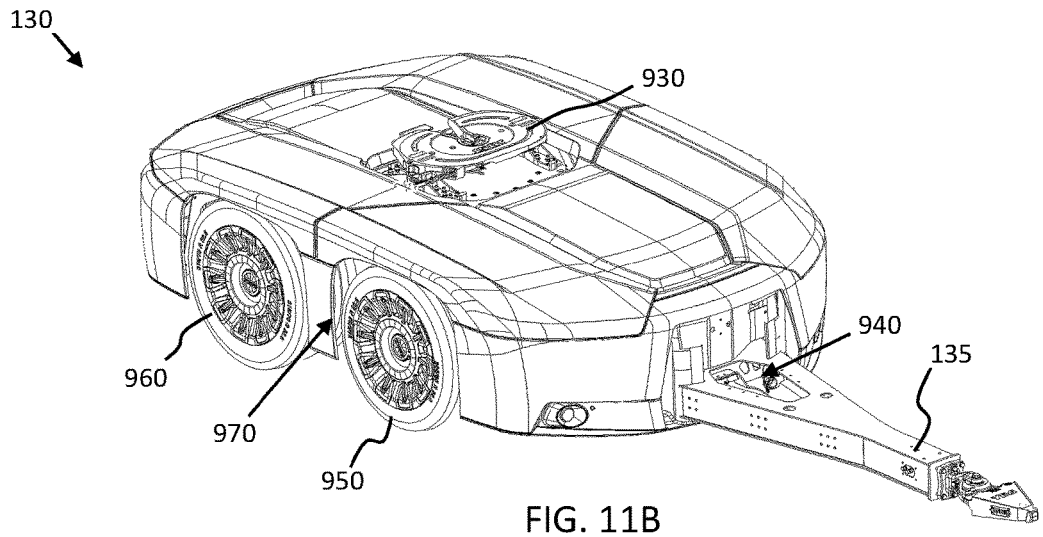
Figure 11C:
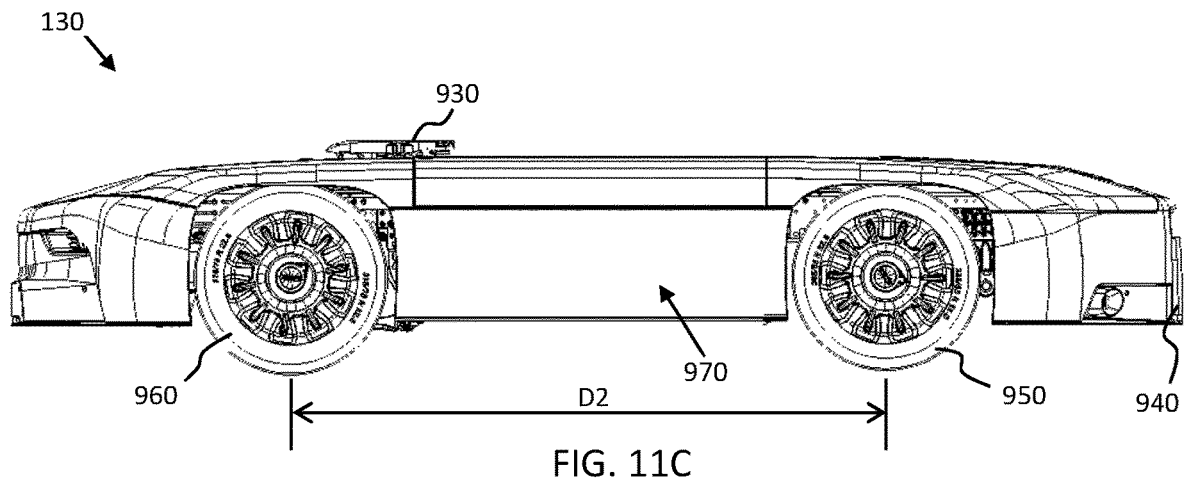
Figure 11D:
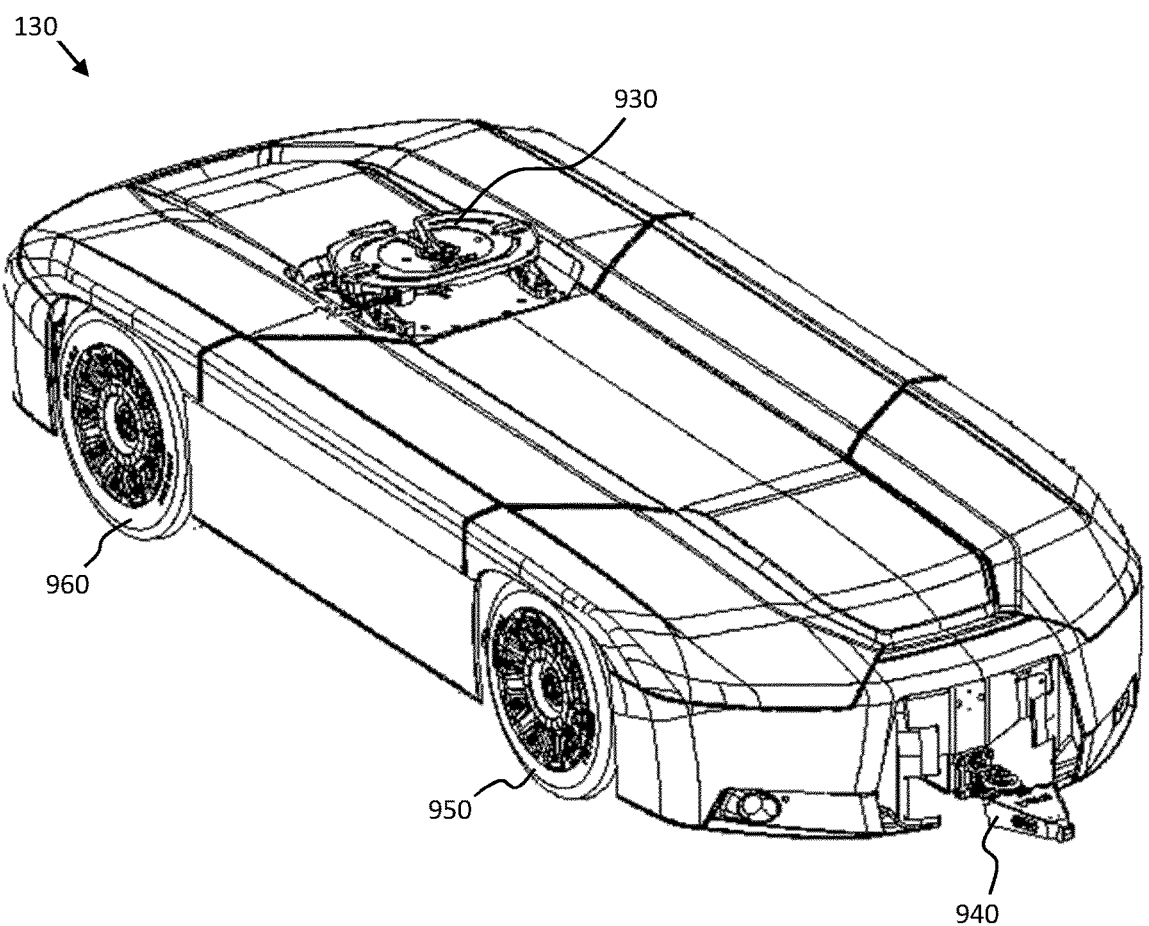

FIGS. 11A-D illustrates an example of a self-powered dolly vehicle unit 130 with an adaptable wheelbase according to the discussions above. FIGS. 11A-B show the dolly vehicle 130 when the wheelbase has been retracted to a wheelbase D1. This mode of operation may, e.g., be suitable when the dolly vehicle operates as a traditional dolly vehicle, i.e., as exemplified in FIG. 1. This dolly vehicle 130 also has a drawbar 135 attached to the drawbar attachment mechanism 940. This drawbar can be released when it is not needed. FIGS. 11C-D show the dolly vehicle 130 when the wheelbase has been extended to a wheelbase D2. This extended configuration allows the dolly vehicle 130 to carry additional energy sources, such as additional battery packs and/or a fuel tank for long haul transport missions.

Figure 12:
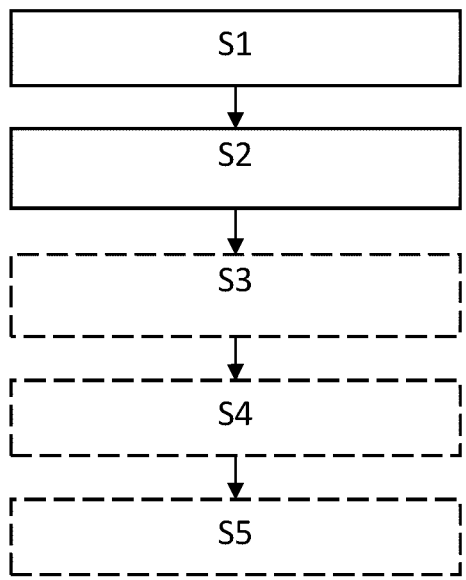
FIG. 12 is a flow chart illustrating methods.

FIG. 12 is a flow chart illustrating methods summarizing the discussions above. FIG. 12 illustrates a method for operating a self-powered dolly vehicle unit 130 comprising an adaptable wheelbase D1, D2. The method comprises obtaining S1 information related to a transport mission to be executed, and configuring S2 the adaptable wheelbase D1, D2 in dependence of the transport mission.

According to some aspects, the method further comprises determining S3 an energy storage requirement to execute the transport mission, and selecting S4 between a first and a second energy source having different energy storage capacity in dependence of the energy storage requirement.

According to some aspects, the method also comprises mounting S5 the selected energy source to a frame structure 970 of the dolly vehicle 130.

Figure 8A:
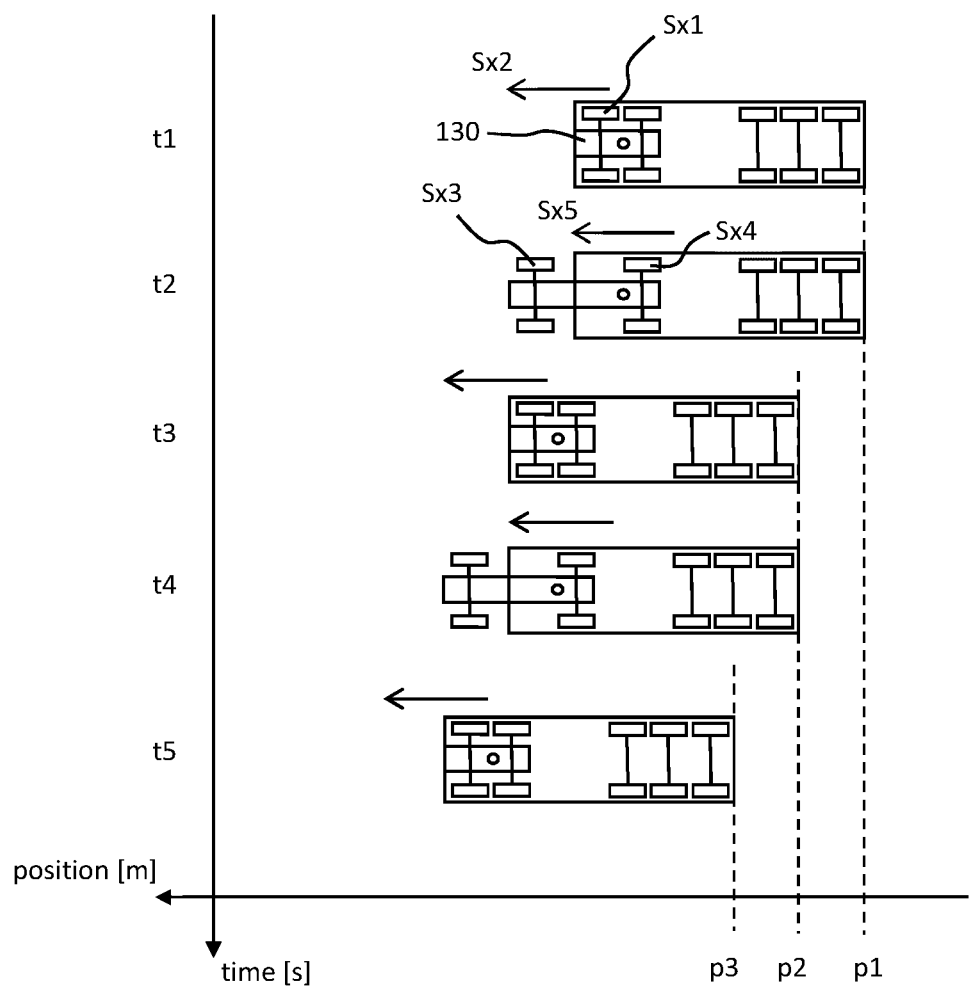
FIGS. 8A-B schematically illustrates a method for a dolly vehicle worm drive.
Figure 8B:
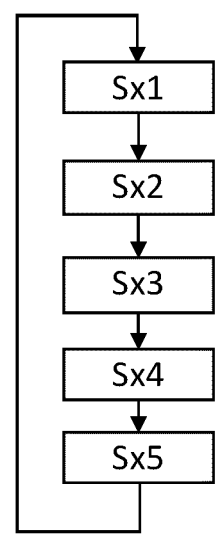

FIGS. 8A and 8B illustrate a method of propulsion which can be realized by a dolly vehicle with an adjustable wheelbase such as the dolly vehicles discussed herein. This method of propulsion may be referred to as dolly vehicle worm drive. With reference to FIG. 8A, which illustrates dolly vehicle position in meters on the x-axis and time in seconds on the y-axis, a dolly vehicle 130 may move forward by first locking, i.e., applying brakes, to the rear axle wheels and releasing brakes on the front axle wheels to set them in a free-rolling condition. By extending the wheelbase, the front axle is pushed forward. The front axle wheels are then locked by engaging wheel brakes and the rear axle wheels are put in free-rolling condition by releasing wheel brakes. The rear axle can then be pulled towards the front axle by decreasing the wheelbase, i.e., by retracting the frame structure. The process is then repeated, whereupon the vehicle combination slowly moves forward. Extending and retracting the wheelbase can be accomplished by, e.g., wheel end electrical machines and/or a hydraulic device as discussed above in connection to FIG. 10A-D.

The same approach can of course also be used to move backwards by reversing the steps illustrated in FIG. 8A.

To summarize, there is illustrated a method for operating a self-powered dolly vehicle unit 130 comprising an adaptable wheelbase D1, D2, wherein the adaptable wheelbase is arranged to be adapted automatically in response to a control signal. The method comprises, repeatedly, releasing Sx1 brakes on a front axle pair of wheels 950, generating Sx2 a control signal to extend the adaptable wheelbase to a first wheelbase D2, engaging Sx3 brakes on the front axle pair of wheels 950, releasing Sx4 brakes on a rear axle pair of wheels 960, and generating Sx5 a control signal to retract the adaptable wheelbase to a second wheelbase D1.

FIG. 9 shows aspects of the disclosed self-powered steerable dolly vehicle 130. The dolly vehicle 130 comprises a steerable front axle 210, although a steerable front axle is not necessary, fixed front axles can also be used. This particular dolly vehicle also comprises a set of service brakes 910, here shown as disc brakes, although drum brakes or retarders are equally possible. The dolly vehicle also comprises an electric machine (EM) 920 and associated electrical energy storage (ESS) 925, which means that the dolly is self-powered and able to move both itself and one or more towed trailers with or without the assistance of a truck or prime mover vehicle 110. The electric machine 920 can be used both for propulsion as well as for regenerative braking. Propulsion drains the energy source 925 while regenerative braking replenished the energy source 925. Alternatively, electric machines can be arranged at each wheel to provide propulsion and braking.

The dolly vehicle may be connected to a truck or other towing vehicle unit via a drawbar connection 940. A trailer may be connected to the dolly via a fifth wheel connection 930.

A control unit 901 is arranged on the dolly vehicle and configured to control the various MSDs on the dolly vehicle, i.e., the brakes, the electric machine, the suspension, the steering. The control unit implements the type of VMM functions discussed above and can be configured in a master mode or in a slave mode depending on operating scenario. The control unit also controls the adjustable frame structure 970 of the dolly vehicle.

The dolly vehicle may furthermore comprise wheel speed sensors WS1-WS4 configured to measure wheel speeds. This enables the control unit 901 to perform fine grained slip control on the wheels using the service brakes and the electric machine. For instance, the control unit 901 on the dolly unit may receive vehicle state data comprising vehicle velocity from sensors or from other control units, and based on this velocity determine wheel slip, in accordance with SAE J670 (SAE Vehicle Dynamics Standards Committee Jan. 24, 2008), as $$\lambda = \frac{R\omega - v_x}{\max(|R\omega|, |v_x|)}$$

where R is an effective wheel radius in meters, ω is the angular velocity of the wheel obtained from the wheel speed sensor, and $v_x$ is the longitudinal speed of the wheel (in the coordinate system of the wheel).

The self-powered dolly vehicle 130 may also comprise force sensors and an inertial measurement unit (IMU) configured to monitor and/or estimate forces acting on the dolly vehicle. These forces may comprise longitudinal forces $F_x$, lateral forces $F_y$, and moments M.

Figure 13:
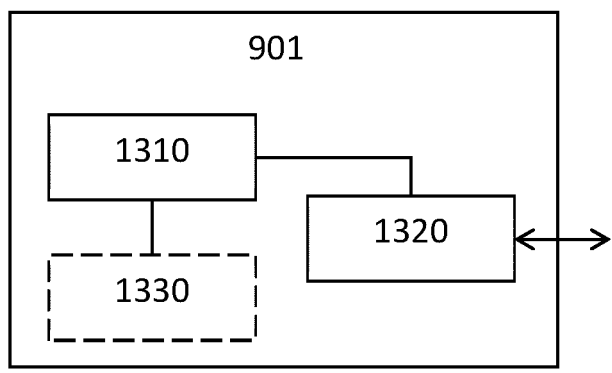
FIG. 13 schematically illustrates a control unit.

FIG. 13 schematically illustrates, in terms of a number of functional units, the components of a control unit 901 according to embodiments of the discussions and methods disclosed herein. This control unit 901 may be comprised in the vehicle 130, e.g., in the form of a VMM unit. Processing circuitry 1310 is provided using any combination of one or more of a suitable central processing unit CPU, multiprocessor, microcontroller, digital signal processor DSP, etc., capable of executing software instructions stored in a computer program product, e.g. in the form of a storage medium 1330. The processing circuitry 1310 may further be provided as at least one application specific integrated circuit ASIC, or field programmable gate array FPGA.

Particularly, the processing circuitry 1310 is configured to cause the control unit 901 to perform a set of operations, or steps, such as the methods discussed in connection to FIG. 10. For example, the storage medium 1330 may store the set of operations, and the processing circuitry 1310 may be configured to retrieve the set of operations from the storage medium 1330 to cause the control unit 901 to perform the set of operations. The set of operations may be provided as a set of executable instructions. Thus, the processing circuitry 1310 is thereby arranged to execute methods as herein disclosed.

The storage medium 1330 may also comprise persistent storage, which, for example, can be any single one or combination of magnetic memory, optical memory, solid state memory or even remotely mounted memory.

The control unit 901 may further comprise an interface 1320 for communications with at least one external device. As such the interface 1320 may comprise one or more transmitters and receivers, comprising analogue and digital components and a suitable number of ports for wireline or wireless communication.

The processing circuitry 1310 controls the general operation of the control unit 901, e.g., by sending data and control signals to the interface 1320 and the storage medium 1330, by receiving data and reports from the interface 1320, and by retrieving data and instructions from the storage medium 1330. Other components, as well as the related functionality, of the control node are omitted in order not to obscure the concepts presented herein.

Figure 14:
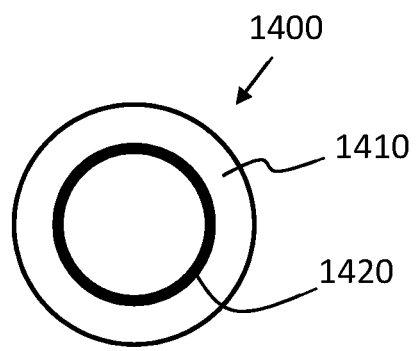
FIG. 14 shows an example computer program product.

FIG. 14 illustrates a computer readable medium 1410 carrying a computer program comprising program code means 1420 for performing, e.g., the methods illustrated in FIG. 12, when said program product is run on a computer. The computer readable medium and the code means may together form a computer program product 1400.

The invention claimed is:

1. A self-powered dolly vehicle unit with an adaptable wheelbase, the dolly vehicle unit comprising:
    a front axle arranged to support a pair of steerable front wheels,
    a rear axle arranged to support a pair of rear wheels,
    a fifth wheel connection for towing a trailer vehicle,
    a draw-bar attachment mechanism arranged to hold a draw-bar, and
    a frame structure arranged to support the front axle and the rear axle at a variable wheelbase distance from each other,
    wherein the frame structure is arranged to be locked at a first wheelbase distance position and at a second wheelbase distance position.

2. The self-powered dolly vehicle unit of claim 1, wherein the draw-bar attachment mechanism is arranged to couple to and to decouple from the draw-bar.

3. The self-powered dolly vehicle unit of claim 1, comprising a bracket configured to releasably hold a first energy source when the frame structure is locked at the first wheelbase distance position, and to releasably hold a second energy source when the frame structure is locked at the second wheelbase distance position, wherein the second energy source is associated with a larger amount of stored energy compared to the first energy source.

4. The self-powered dolly vehicle unit of claim 3, wherein the first energy source comprises an electrical energy storage, a fuel cell, or a fuel tank.

5. The self-powered dolly vehicle unit of claim 3, wherein the second energy source comprises an electrical energy storage, a fuel cell, or a fuel tank.

6. The self-powered dolly vehicle unit of claim 1, wherein the frame structure comprises a front section and a rear section arranged slidably with respect to each other, and a clamping mechanism arranged to releasably hold the front and the rear sections in position relative to each other.

7. The self-powered dolly vehicle unit of claim 1, further comprising at least one of a hydraulic actuator arranged to extend and to retract the frame structure in response to a control signal, and an electric machine with a rack and pinion mechanism configured to extend and to retract the frame structure in response to the control signal.

8. The self-powered dolly vehicle unit of claim 1, wherein at least one of the front wheels and the rear wheels are driven wheels and wherein at least the other of the front wheels and the rear wheels comprises a brake, wherein the driven wheels and the braked wheels are arranged to extend and to retract the frame structure in response to a control signal.

9. The self-powered dolly vehicle unit of claim 1, wherein the front wheel pair and the rear wheel pair are driven by electric machines, wherein each wheel is arranged to be driven by a respective electric machine.

10. The self-powered dolly vehicle unit of claim 1, comprising a control unit arranged to control an operation of the self-powered dolly vehicle unit.

11. The self-powered dolly vehicle unit of claim 10, wherein the control unit is arranged to determine an energy storage requirement in dependence of a configured transport mission, and to adjust the frame structure to the first wheelbase distance position or to the second wheelbase distance position in dependence of the energy storage requirement.

12. The self-powered dolly vehicle unit of claim 10, wherein the control unit is arranged to determine an energy storage requirement in dependence of a configured transport mission, and to select between a first and a second energy source having different energy storage capacity in dependence of the energy storage requirement.

13. A method for operating a self-powered dolly vehicle unit comprising an adaptable wheelbase, the method comprising:
    obtaining information related to a transport mission to be executed,
    configuring the adaptable wheelbase in dependence of the transport mission,
    determining an energy storage requirement to execute the transport mission, and
    selecting between a first and a second energy source having different energy storage capacity in dependence of the energy storage requirement.

14. The method of claim 13, further comprising:
    mounting the selected energy source to a frame structure of the dolly vehicle.

15. A control unit comprising processing circuitry configured to perform the method of claim 13.

16. A method for operating a self-powered dolly vehicle unit comprising an adaptable wheelbase, wherein the adaptable wheelbase is arranged to be adapted automatically in response to a control signal, the method comprising:
    repeatedly releasing brakes on a front axle pair of wheels,
    repeatedly generating a control signal to extend the adaptable wheelbase to a first wheelbase,
    repeatedly engaging the brakes on the front axle pair of wheels,
    repeatedly releasing brakes on a rear axle pair of wheels, and
    repeatedly generating a control signal to retract the adaptable wheelbase to a second wheelbase.

* * * * *